United States Patent [19]

Ludwig

[11] 4,047,696

[45] Sept. 13, 1977

[54] BUTTERFLY VALVE

[75] Inventor: George Ludwig, Troy, Mich.

[73] Assignee: Tom McGuane Industries, Inc., Orchard Lake, Mich.

[21] Appl. No.: 667,637

[22] Filed: Mar. 17, 1976

[51] Int. Cl.² .............................................. F16K 1/22
[52] U.S. Cl. ................................ 251/308; 29/157.1 R
[58] Field of Search ............... 251/305, 306, 307, 308; 29/157.1 R

[56] References Cited

U.S. PATENT DOCUMENTS

| 3,568,975 | 3/1971 | Obermaier et al. | 251/308 |
| 3,666,235 | 5/1972 | Scott | 251/306 |
| 3,675,681 | 7/1972 | Obermaier | 251/305 |
| 3,704,721 | 12/1972 | Schmitz et al. | 251/305 |
| 3,902,697 | 9/1975 | Robinson | 251/306 |

Primary Examiner—William R. Cline
Assistant Examiner—H. Jay Spiegel
Attorney, Agent, or Firm—Barnes, Kisselle, Raisch & Choate

[57] ABSTRACT

A butterfly valve comprising a body having a cylindrical passage and a diametral pivot pin and a butterfly valve plate fixed to the pivot pin. The plate is formed with a planar central portion at which the pin is connected to the plate. In assembly, the pin is first placed in position and then the valve plate is adjusted angularly and radially until the periphery of the plate is in sealing relation to the inner surface of the passage. The plate is then fastened to the pin by welding.

7 Claims, 4 Drawing Figures

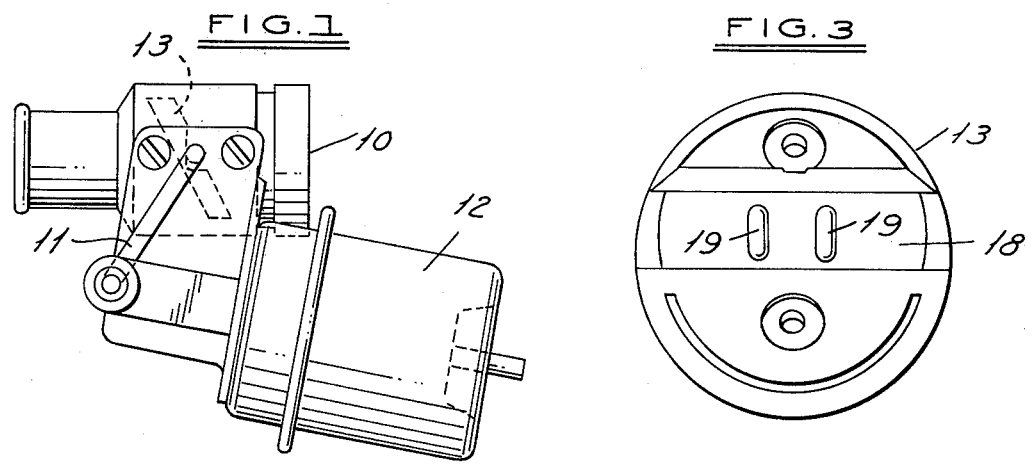
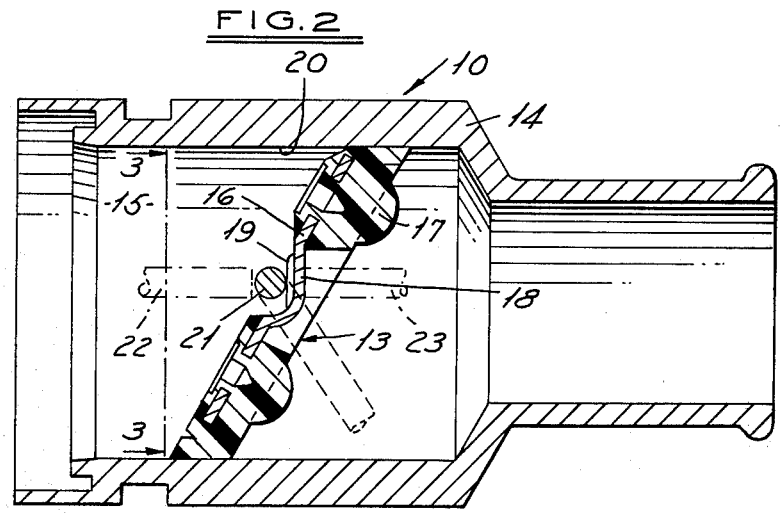
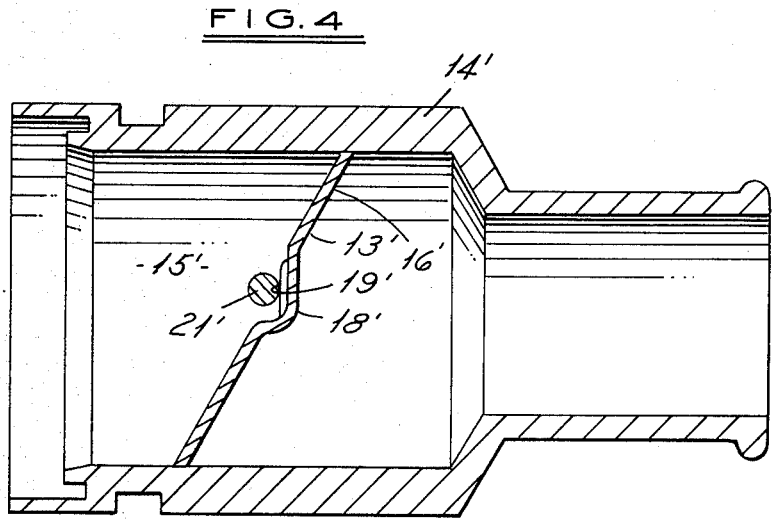

4,047,696

BUTTERFLY VALVE

This invention relates to butterfly valves and particularly to butterfly valves as utilized for controlling the flow of liquids.

BACKGROUND OF THE INVENTION

In butterfly valves such as are used in controlling the flow of liquids to heating systems as in autmobile heating systems, it is common to provide a body having a generally cylindrical passage, a pivot pin extending radially into the passage and a valve plate fixed to the pin so that when the pin is rotated, the plate is moved into open or closing relationship to the periphery of the passage.

A common problem with respect to such valves is that due to the tolerances in manufacture of the parts, it is difficult to obtain a seal between the valve plate and the inner surface of the passage. In an effort to facilitate obtaining the seal, the plate usually has a periheral portion made of resilient material. However, even in such an instance, the pin usually engages a diametral groove in the plate and if the tolerances are beyond permissible limits, it is quite common to encounter leakage along at least a portion of the periphery of the valve when the valve is in closed position.

Accordingly among the objects of the invention are to provide a butterfly valve which will minimize the problem of leakage. A further object of the invention is to provide a method of making a valve which obviates the problem of leakage.

SUMMARY OF THE INVENTION

In accordance with the invention, the valve plate is formed with a diametral flat portion. In assembly, the pin is first placed in position in the body and then the valve plate is brought into position with the diametrically extending portion engaging the pin. The valve plate is then moved angularly and radially until the periphery of the plate is in sealing engagement with the inner surface of the passage in the body. The plate is then fastened to the body as by welding.

DESCRIPTION OF THE DRAWINGS

FIG. 1 is a side elevational view of a butterfly valve showing its use in a liquid valve environment.

FIG. 2 is a longitudinal sectional view of the valve embodying the invention.

FIG. 3 is a view tken along the line 3—3 of the valve plate.

FIG. 4 is a longitudinal sectional view of a modified form of valve.

DESCRIPTION

Referring to FIG. 1, the invention is shown in connection with a butterfly valve 10 that includes an arm 11 that is actuated by a motor 12 to move the valve plate 13 and thereby control the flow of liquid, for example, as in an automobile heating system.

The valve 10 includes a metal or plastic body 14 having a passage 15 that is generally cylindrical. Valve plate 13 comprises a metal plate 16 embedded about its periphery in a resilient body 17. The central portion 18 that extends generally diametrically of the valve plate 13 is formed with a flat planar portion 19 that is at an acute angle to the general plane of the plate 16. The position of the planar portion 19 is such that when the periphery of the valve 13 is in sealing engagement with the inner surface 20 of the passage 15, the planar portion 19 extends radially of the passage of the passage and perpendicular to the axis of said passage and the valve 13 is at an acute angle to the axis of the passage.

In assembly, a pivot pin 21 is positioned so that it extends generally diametrically of passage 15. The valve plate 13 is then brought into position with the planar portion 19 engaging the pin 21. The valve 13 is then moved radially as well as angularly with respect to the axis of the pivot pin 21 until the periphery of the valve 13 is in sealing relationship with the entire circumference of the surface 20 of passage 15. The valve 13 is then fastened to the pin as by bringing electrodes 22 & 23 into engagement with the pin and central portion 18 and by welding the plate to the pin.

It can thus be seen that in this manner when the valve 13 is closed, the sealing relationship between the periphery of the valve 13 and the surface 20 is insured regardless of manufacturing tolerances.

Although the invention has been described in connection with a water valve, it also has utility in other types of valves where fluid is controlled and wherein a resilient seal is not provided in the periphery of the butterfly valve. For example as shown in FIG. 4, the body 14' is provided with a pivot pin 21' and the valve plate 13' made of metal or plastic is formed with a corresponding central portion 18' that includes a planar portion 19' that forms an acute angle with the plane of the plate 16' and extends diametrically of the passage 15' when the valve 13' is in closed position.

I claim:

1. In a butterfly valve, the combination comprising
a housing having an opening therethrough,
at least a portion of said opening defining a cylindrical passage,
a pivot pin extending generally diametrally through said body across said passage,
and a valve plate having a diametrically extending central portion which extends radially of the passage and perpendicular to the axis of said passage when the valve plate is in inclined position with respect to the axis of said passage and the periphery of the valve plate is in sealing engagement with the interior surface of said passage,
said last-mentioned portion being planar such that said valve plate can be positioned centrally of the passage with the flat portion engaging the pin before fastening said plate to said pin.

2. The combination set forth in claim 1 wherein said valve plate has at least the peripheral portion thereof formed with a rubber gasket that engages the surface of said passage when said plate is in position with the planar portion thereof extending radially of the passage and the general plane thereof forming an acute angle with respect to the axis of the passage.

3. The combination set forth in claim 2 wherein substantially the entire valve plate except for said planar portion is embedded in resilient material.

4. In a butterfly valve, the combination comprising
a housing having an opening therethrough,
at least a portion of said opening defining a cylindrical passage,
a pivot pin extending generally diametrally through said body across said passage,
and a metal valve plate having a diametrically extending central portion which extends radially of the passage and perpendicular to the axis of said passage when the valve plate is in inclined position with respect to the axis of said passage, said last-mentioned portion being planar such that said valve plate can be positioned centrally of the passage with the flat portion engaging the pin before fastening said plate to said pin, said valve plate having at least the peripheral portion thereof formed with a resilient gasket that engages the surface of said passage when said plate is in position with the planar portion thereof extending radially of the passage and the general plane thereof forming an acute angle with respect to the axis of the passage.

5. The combination set forth in claim 4 wherein substantially the entire valve plate except for said planar portion is embedded in resilient material.

6. The method of making a butterfly valve which comprises positioning a pin in a body that has a generally cylindrical passage with the pin extending diametrically of the passage, bringing a valve plate, that is generally oval and has a flat diametral portion, in position such that said flat diametral portion extends radially of the passage and the plate extends at an acute angle to the axis of the passage, moving said radial plate angularly and radially of the passage relative to the pin and passage until the periphery thereof is in uniform sealing relationship with the side wall of the passage and the diametral portion extends radially and perpendicular to the axis of said passage, and thereafter fastening said plate to said pin by moving electrodes axially into contact with the pin and plate.

7. The method set forth in claim 6 wherein said step of fastening is achieved by welding said pin to said plate.

* * * * *